(12) United States Patent
Shimizu et al.

(10) Patent No.: US 9,811,211 B2
(45) Date of Patent: *Nov. 7, 2017

(54) POSITION SENSOR

(71) Applicant: NITTO DENKO CORPORATION, Ibaraki-shi, Osaka (JP)

(72) Inventors: Yusuke Shimizu, Ibaraki (JP); Ryoma Yoshioka, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 38 days.

This patent is subject to a terminal disclaimer.

(21) Appl. No.: 14/768,060

(22) PCT Filed: Jan. 14, 2014

(86) PCT No.: PCT/JP2014/050400
§ 371 (c)(1),
(2) Date: Aug. 14, 2015

(87) PCT Pub. No.: WO2014/136471
PCT Pub. Date: Sep. 12, 2014

(65) Prior Publication Data
US 2015/0378517 A1    Dec. 31, 2015

(30) Foreign Application Priority Data

Mar. 6, 2013  (JP) .................................. 2013-044071
Apr. 19, 2013  (JP) .................................. 2013-087939

(51) Int. Cl.
*G06F 3/042*    (2006.01)
*G06F 3/041*    (2006.01)
(Continued)

(52) U.S. Cl.
CPC ............. *G06F 3/0428* (2013.01); *G02B 6/43* (2013.01); *G06F 1/16* (2013.01); *G06F 3/0418* (2013.01);
(Continued)

(58) Field of Classification Search
CPC ...... G06F 3/0421; G06F 3/042; G06F 3/0428; G06F 2203/04109; G06F 2203/04103;
(Continued)

(56) References Cited

U.S. PATENT DOCUMENTS 6,389,209 B1 * 5/2002 Suhir .................... G02B 6/122
385/129
6,396,598 B1    5/2002 Kashiwagi et al.
(Continued)

FOREIGN PATENT DOCUMENTS

CN    1308352 A    8/2001
CN    1614534 A    5/2005
(Continued)

OTHER PUBLICATIONS

Notification of Transmittal of Translation of the International Preliminary Report on Patentability (Forms PCT/IB/338) issued in the counterpart International Application No. PCT/JP2014/050400 dated Sep. 17, 2015 with Forms PCT/IB/373 and PCT/IB/237. (6 pages).

(Continued)

*Primary Examiner* — Sanjiv D Patel
(74) *Attorney, Agent, or Firm* — Westerman, Hattori, Daniels & Adrian, LLP

(57) ABSTRACT

A position sensor includes: a sheet-form optical waveguide including a sheet-form under cladding layer, a plurality of linear cores arranged in a lattice form and formed on a surface of the under cladding layer, and a sheet-form over cladding layer covering the cores; a light-emitting element (Continued)

connected to one end surface of the cores; and a light-receiving element connected to the other end surface of the cores. The cores have an elasticity modulus higher than that of the under cladding layer and that of the over cladding layer. The deformation rate of a cross section of the cores as seen in a pressed direction is lower than the deformation rates of cross sections of the over cladding layer and the under cladding layer when a surface of the sheet-form optical waveguide is pressed.

3 Claims, 2 Drawing Sheets

(51) Int. Cl.
　　G02B 6/43　　(2006.01)
　　G06F 1/16　　(2006.01)
(52) U.S. Cl.
　　CPC .. G06F 3/0421 (2013.01); *G06F 2203/04109* (2013.01)
(58) Field of Classification Search
　　CPC ... G06F 3/03545; G06F 3/041; G02B 6/0018; G02B 6/0028; G02B 6/0076; G02B 6/003; G02B 6/122; G02F 1/035; G02F 1/065; G02F 1/025; G02F 1/225; G02F 1/011; G02F 1/01708; G02F 1/2257; G02F 2001/217; G02F 1/313
　　See application file for complete search history.

(56) References Cited

U.S. PATENT DOCUMENTS

| | | | |
|---|---|---|---|
| 7,496,266 | B2 | 2/2009 | Enami et al. |
| 8,325,158 | B2* | 12/2012 | Yatsuda ............ B29D 11/00663 345/176 |
| 2001/0013861 | A1 | 8/2001 | Shimizu |
| 2004/0164972 | A1 | 8/2004 | Carl |
| 2004/0179804 | A1* | 9/2004 | Kuramoto ............ G02B 6/1221 385/131 |
| 2007/0025672 | A1* | 2/2007 | Suzuki ................ G02B 6/10 385/129 |
| 2008/0019616 | A1 | 1/2008 | Hotta et al. |
| 2008/0031579 | A1* | 2/2008 | Enami ................. G02B 6/1221 385/102 |
| 2008/0193094 | A1* | 8/2008 | Enami ................. G02B 6/10 385/130 |
| 2008/0284925 | A1* | 11/2008 | Han .................... G06F 3/0425 349/12 |
| 2009/0142026 | A1* | 6/2009 | Shioda ................ G02B 6/1221 385/131 |
| 2009/0196562 | A1* | 8/2009 | Ishida ................. G02B 6/1221 385/130 |
| 2009/0263077 | A1* | 10/2009 | Ushiwata .............. G02B 6/43 385/14 |
| 2010/0150510 | A1* | 6/2010 | Sato ................... G02B 6/1221 385/130 |
| 2010/0156848 | A1* | 6/2010 | Yatsuda ............ B29D 11/00663 345/175 |
| 2010/0171717 | A1 | 7/2010 | Hu et al. |
| 2011/0033682 | A1* | 2/2011 | Shimizu ................ B32B 15/08 428/213 |
| 2011/0079501 | A1 | 4/2011 | Arai |
| 2011/0262091 | A1* | 10/2011 | Takasaki ............ G02B 6/1221 385/129 |
| 2012/0020609 | A1* | 1/2012 | Kasai ................... B41J 19/20 385/14 |
| 2012/0318074 | A1* | 12/2012 | Kyung .................. G01L 1/243 73/862.624 |
| 2012/0327033 | A1 | 12/2012 | Shimizu et al. |
| 2013/0009911 | A1 | 1/2013 | Shibata et al. |
| 2013/0015334 | A1 | 1/2013 | Chen et al. |
| 2014/0285727 | A1* | 9/2014 | Seo ..................... G06F 3/0421 349/12 |

FOREIGN PATENT DOCUMENTS

| | | | |
|---|---|---|---|
| CN | 1734470 | A | 2/2006 |
| CN | 1752994 | A | 3/2006 |
| CN | 1774690 | A | 5/2006 |
| CN | 1855010 | A | 11/2006 |
| CN | 102034765 | A | 4/2011 |
| CN | 102411433 | A | 4/2012 |
| CN | 102411458 | A | 4/2012 |
| CN | 102722284 | A | 10/2012 |
| CN | 102812503 | A | 12/2012 |
| CN | 102831391 | A | 12/2012 |
| CN | 102890565 | A | 1/2013 |
| JP | 56-021279 | A | 2/1981 |
| JP | 60-117322 | A | 6/1985 |
| JP | 61-188515 | A | 8/1986 |
| JP | 1-172916 | A | 7/1989 |
| JP | 02-115919 | A | 4/1990 |
| JP | 05-119909 | A | 5/1993 |
| JP | 8-234895 | A | 9/1996 |
| JP | 10-49285 | A | 2/1998 |
| JP | 10-91348 | A | 4/1998 |
| JP | 2001-222378 | A | 8/2001 |
| JP | 2002-344641 | A | 11/2002 |
| JP | 2005-107804 | A | 4/2005 |
| JP | 3746378 | B2 | 2/2006 |
| JP | 2006-172230 | A | 6/2006 |
| JP | 2006-301979 | A | 11/2006 |
| JP | 2007-34907 | A | 2/2007 |
| JP | 2010-151992 | A | 7/2010 |
| JP | 2012-198301 | A | 10/2012 |
| JP | 2013-8138 | A | 1/2013 |
| WO | 2006/001434 | A1 | 1/2006 |
| WO | 2014/136471 | A1 | 9/2014 |
| WO | 2014/136472 | A1 | 9/2014 |
| WO | 2014/136508 | A1 | 9/2014 |

OTHER PUBLICATIONS

International Search Report dated Mar. 4, 2014, issued in counterpart application No. PCT/JP2014/050400 (1 pages).
Office Action dated Feb. 6, 2017, issued in counterpart Taiwanese Patent Application No. 103101261, with English translation. (7 pages).
International Search Report dated Mar. 4, 2014, issued in International Application No. PCT/JP2014/051027, with English translation.
International Search Report dated Mar. 4, 2014, issued in International Application No. PCT/JP2014/051026, with English translation.
International Search Report dated Mar. 4, 2014, issued in International Application No. PCT/JP2014/051028, with English translation. (4 pages).
U.S. Office Action dated Dec. 9, 2014, issued in U.S. Appl. No. 14/361,996 (16 pages).
Chinese Search Report dated Mar. 12, 2015, issued in Chinese Patent Application No. 201480000284.2, with English translation (4 pages).
U.S. Office Action dated Jul. 10, 2015, issued in U.S. Appl. No. 14/362,060 (20 pages).
Chinese Search Report dated Jun. 25, 2015, issued in Chinese Application No. 201480000283.8 (with English translation) (4 pages).
Notification of Transmittal of Translation of International Preliminary Report on Patentability (Form PCT/IB/338) issued in counterpart International Application No. PCT/JP2014/051027 dated Sep. 17, 2015, with Forms PCT/ISA/237 and PCT/IB/373 (6 pages).
Notification of Transmittal of Translation of the International Preliminary Report on Patentability (Form PCT/IB/338) issued in

(56) References Cited

OTHER PUBLICATIONS counterpart International Patent Application No. PCT/JP2014/051028 dated Sep. 17, 2015 with Forms PCT/IB/373 and PCT/ISA/237 (6 pages).
Extended European Search Report dated Oct. 27, 2015, issued in European Patent Application No. 14727699.2 (8 pages).
Extended European Search Report dated Oct. 27, 2015, issued in European Patent Application No. 1427698.4 (10 pages).
Extended European Search Report dated Oct. 27, 2015, issued in European Patent Application No. 14727700.8 (9 pages).
Wouters, et al., "Determining the Young's modulus and creep effects in three different photo definable epoxies for MEMS applications", Sensors and Actuators A: Physical, 2009, pp. 196-200.
Notification of Transmittal of Translation of the International Preliminary Report on Patentability (Form PCT/IB/338) issued in counterpart International Application No. PCT/JP2014/051026 dated Sep. 17, 2015, with Forms PCT/IB/373 and PCT/ISA/237 (7 pages).
Office Action with Search Report dated Mar. 2, 2017, issued in counterpart Chinese Patent Application No. 201480011114.4, with English translation. (12 pages).

\* cited by examiner

POSITION SENSOR

TECHNICAL FIELD

The present invention relates to a position sensor for optically sensing a pressed position.

BACKGROUND ART

A position sensor for optically sensing a pressed position has been hitherto proposed (see PTL 1, for example). This position sensor is configured such that a plurality of cores serving as optical paths are arranged in two directions perpendicular to each other and such that a cladding covers peripheral edge portions of the cores to provide a sheet form. The position sensor is also configured such that light from a light-emitting element is incident on one end surface of the cores and such that the light passing through the cores is received by a light-receiving element at the other end surface of the cores. When part of the surface of the position sensor in the sheet form is pressed with a finger and the like, some of the cores corresponding to the pressed part are crushed (decreased in cross-sectional area as seen in the pressed direction). The level of light received by the light-receiving element is decreased in the cores corresponding to the pressed part, so that the aforementioned pressed position is sensed.

An input device having a pressure-sensitive touch panel and a display has been proposed as an input device for inputting characters and the like (see PTL 2, for example). This input device is configured such that, when a character or the like is inputted onto the aforementioned pressure-sensitive touch panel with a pen, the pressure-sensitive touch panel senses the position pressed with the tip of the pen to output the pressed position to the aforementioned display, so that the inputted character or the like appears on the display.

RELATED ART DOCUMENTS

Patent Documents

PTL 1: JP-A-HEI8(1996)-234895
PTL 2: JP-A-2006-172230

SUMMARY OF INVENTION

In general, when a person writes a character or the like on a paper sheet with a writing implement such as a pen, the little finger of his/her hand which holds the writing implement, the base thereof (hypothenar) and the like also come into contact with the surface of the paper sheet.

Thus, when a character or the like is inputted onto the surface of the position sensor in the sheet form as disclosed in PTL 1 described above with a writing implement such as a pen, not only the tip of the pen but also the little finger of the hand which holds the writing implement, the base thereof and the like press the position sensor in the sheet form. As a result, not only the inputted character or the like but also the unwanted positions of the little finger and the base thereof are sensed.

Likewise, when a character or the like is inputted to the input device disclosed in PTL 2 described above, the pressure-sensitive touch panel senses not only the position pressed with the tip of the pen but also the position pressed with the little finger of the hand which holds the writing implement, the base thereof and the like. As a result, not only the inputted character or the like but also the unwanted positions of the little finger and the base thereof appear on the display.

In view of the foregoing, it is therefore an object of the present invention to provide a position sensor configured such that the positions pressed with the unwanted parts such as the little finger of a hand which holds an input element such as a pen and the base of the little finger are not sensed when information such as a character is inputted to the position sensor with the input element.

To accomplish the aforementioned object, a position sensor in a sheet form according to the present invention comprises: an optical waveguide in a sheet form including an under cladding layer in a sheet form, a plurality of linear cores arranged in a lattice form and formed on a surface of the under cladding layer, and an over cladding layer in a sheet form formed to cover the cores; a light-emitting element connected to one end surface of the cores; and a light-receiving element connected to the other end surface of the cores, wherein a pressed position is specified, based on a change in the amount of light propagating in the cores, when a surface of the position sensor is pressed at any position, wherein the cores have an elasticity modulus higher than that of the under cladding layer and that of the over cladding layer, and wherein the deformation rate of a cross section of the cores as seen in a pressed direction is lower than the deformation rates of cross sections of the over cladding layer and the under cladding layer when a surface of the optical waveguide in the sheet form is pressed.

The term "deformation rate" as used in the present invention refers to the proportion of the amount of change in the thickness of the cores, the over cladding layer and the under cladding layer as seen in the pressed direction during the pressing to the thickness thereof before the pressing.

The present inventors have made studies about the propagation of light in linear cores to prevent a position pressed with a part of a hand holding an input element such as a pen from being sensed when information such as a character is inputted with the input element onto a surface of a position sensor including an optical waveguide in a sheet form including the linear cores arranged in a lattice form. In the course of the studies, the present inventors have hit upon the idea of preventing the cores from being crushed (holding the cross-sectional area of the cores) by the pressure of a pen tip or the hand holding the pen, rather than causing the cores to be crushed (to decrease in cross-sectional area) by the aforementioned pressure as in the conventional technique. Thus, the elasticity modulus of the cores was made higher than that of the under cladding layer and that of the over cladding layer. Then, the over cladding layer and the under cladding layer both in the part pressed with the pen tip and in the part pressed with the hand were deformed so as to be crushed as seen in the pressed direction, whereas the cores were bent along the parts of the pen tip and the hand so as to sink in the under cladding layer while holding the cross-sectional area thereof. The bend in the cores was a sharp bend in the part pressed with the pen tip, and the bend in the cores was a gentle bend in the part pressed with the hand. As a result, it has been found that light leakage (scattering) from the cores occurs in the cores in the part pressed with the pen tip because of the sharp bend of the cores, but the aforementioned light leakage (scattering) does not occur in the cores in the part pressed with the hand because of the gentle bend of the cores. That is, the level of light received (the amount of light received) by the light-receiving element is decreased in the cores in the part pressed with the pen tip, but is not decreased in the cores in the part pressed with the hand. The present inventors have found that the position of the pen tip is sensed based on the decrease in the level of received light, and the part pressed with the hand in which the level of received light does not decrease is in the same state as an unpressed part and is not sensed. Hence, the present inventors have attained the present invention.

In the position sensor according to the present invention, the elasticity modulus of the cores is higher than that of the under cladding layer and that of the over cladding layer. Accordingly, when the surface of the over cladding layer of the optical waveguide is pressed, the deformation rate of the cross section of the cores as seen in the pressed direction is lower than the deformation rates of the cross sections of the over cladding layer and the under cladding layer. The cross-sectional area of the cores as seen in the pressed direction is held. When information such as a character is inputted onto the surface of the position sensor with an input element such as a pen, the bend in the cores is sharp along the tip input part of the input element in the part pressed with the tip input part such as a pen tip to cause light leakage (scattering) from the cores, whereas the bend in the cores is gentle along the hand in the part pressed with the hand holding the input element to prevent the occurrence of the aforementioned light leakage (scattering). Thus, the level of light received by the light-receiving element is decreased in the cores pressed with the tip input part such as a pen tip, but is prevented from decreasing in the cores pressed with the hand holding the input element. The position of the tip input part such as a pen tip is sensed based on the decrease in the level of received light, and the part pressed with the hand in which the level of received light does not decrease is in the same state as an unpressed part and is not sensed.

DESCRIPTION OF EMBODIMENTS

Next, an embodiment according to the present invention will now be described in detail with reference to the drawings.

Figure 1A:
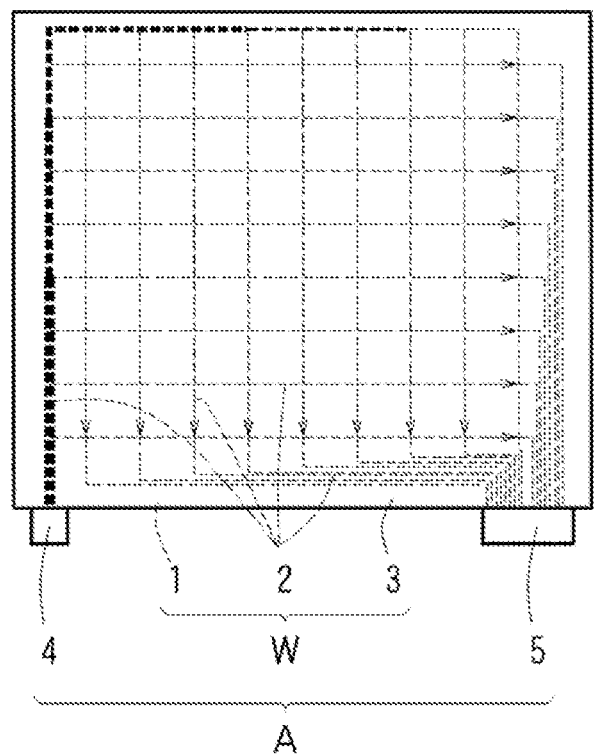
FIG. 1A is a plan view schematically showing one embodiment of a position sensor according to the present invention.
Figure 1B:
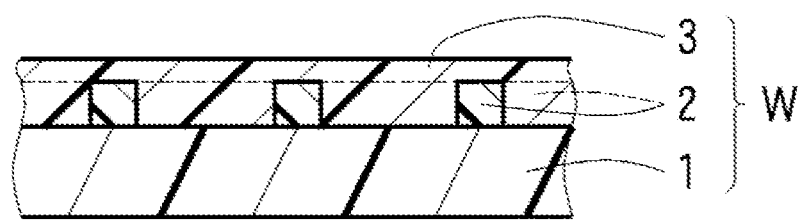
FIG. 1B is an enlarged sectional view thereof.

FIG. 1A is a plan view showing one embodiment of a position sensor according to the present invention. FIG. 1B is a sectional view, on an enlarged scale, of a middle portion of the position sensor. The position sensor A of this embodiment includes: an optical waveguide W in a rectangular sheet form configured such that linear cores 2 arranged in a lattice form are held between an under cladding layer 1 and an over cladding layer 3 both in a rectangular sheet form; a light-emitting element 4 connected to one end surface of the linear cores 2 arranged in the lattice form; and a light-receiving element 5 connected to the other end surface of the linear cores 2. Light emitted from the light-emitting element 4 passes through the cores 2 and is received by the light-receiving element 5. The cores 2 have an elasticity modulus higher than the elasticity modulus of the under cladding layer 1 and the elasticity modulus of the over cladding layer 3. Accordingly, when the surface of the optical waveguide W in the rectangular sheet form is pressed, the deformation rate of the cross section of the cores 2 as seen in the pressed direction is lower than the deformation rates of the cross sections of the over cladding layer 3 and the under cladding layer 1. In FIG. 1A, the cores 2 are indicated by broken lines, and the thickness of the broken lines indicates the thickness of the cores 2. Also, in FIG. 1A, the number of cores 2 are shown as abbreviated. Arrows in FIG. 1A indicate the directions in which light travels.

Figure 2A:
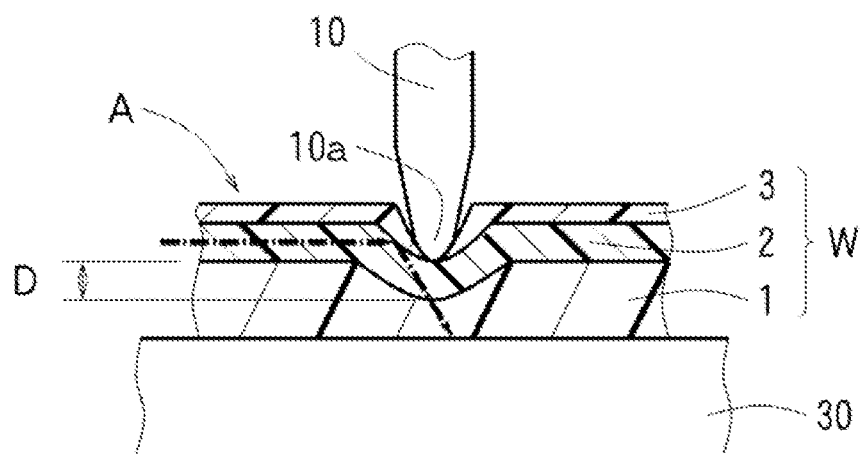
FIG. 2A is a sectional view schematically showing the position sensor pressed with an input element.
Figure 2B:
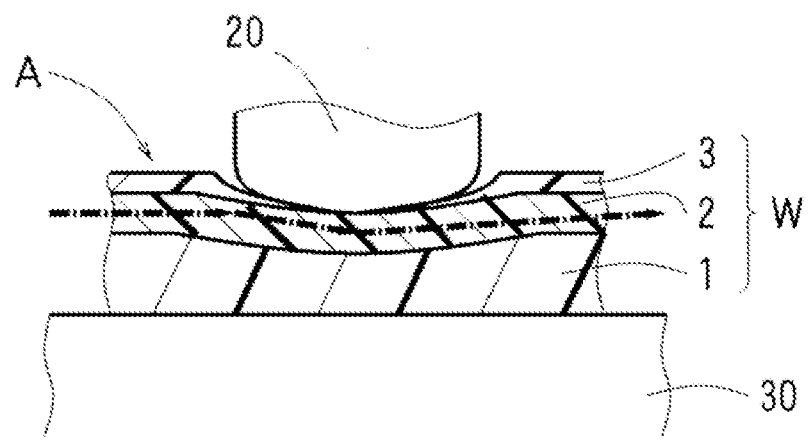
FIG. 2B is a sectional view schematically showing the position sensor pressed with a hand.

As shown in sectional views in FIGS. 2A and 2B, when the position sensor A is placed on a flat base 30 such as a table and information such as a character is inputted, for example, by writing into a region of the surface of the position sensor A which corresponds to the cores 2 in the lattice form with an input element 10 such as a pen held in a hand 20, part of the position sensor A which is pressed with a tip input part 10a such as a pen tip (with reference to FIG. 2A) and part of the position sensor A which is pressed with the little finger of the hand 20 or the base thereof (hypothenar) (with reference to FIG. 2B) are deformed in cross sections as seen in the pressed direction in such a manner that the over cladding layer 3 and the under cladding layer 1 which have a lower elasticity modulus are crushed, and that the cores 2 having a higher elasticity modulus are bent along the parts of the tip input part 10a and the hand 20 so as to sink in the under cladding layer 1 while holding the cross-sectional area thereof.

In the part pressed with the tip input part 10a, the cores 2 are bent sharply, as shown in FIG. 2A, because the tip input part 10a is sharp-pointed, so that light leakage (scattering) from the cores 2 occurs (with reference to dash-double-dot arrows in FIG. 2A). In the part pressed with the hand 20 holding the input element 10, whereas, the cores 2 are bent gently, as shown in FIG. 2B, because the hand 20 is considerably larger and rounder than the tip input part 10a, so that the aforementioned light leakage (scattering) does not occur (light travels in the cores 2 without leaking from the cores 2) (with reference to dash-double-dot arrows in FIG. 2B). Thus, the level of light received by the light-receiving element 5 is decreased in the cores 2 pressed with the tip input part 10a, but is prevented from decreasing in the cores 2 pressed with the hand 20 holding the input element 10. The position (coordinates) of the tip input part 10a is sensed based on the decrease in the level of received light. The part pressed with the hand 20 in which the level of received light does not decrease is in the same state as an unpressed part, and is not sensed.

It is only necessary for the input element 10 to be able to press the surface of the position sensor A in the aforementioned manner. The input element 10 is not limited to the writing implement capable of writing on a paper sheet with ink and the like but may be a mere rod or stick incapable of writing on a paper sheet with ink and the like. When the aforementioned pressing is released (the tip input part 10a is moved away or the input such as writing is completed), the under cladding layer 1, the cores 2 and the over cladding layer 3 return to their original states (with reference to FIG. 1B) because of their resilience. It is preferable that the sinking depth D of the cores 2 in the under cladding layer 1 is a maximum of 2000 μm. When the sinking depth D exceeds 2000 μm, there are dangers that the under cladding layer 1, the cores 2 and the over cladding layer 3 do not return to their original states and that cracking occurs in the optical waveguide W.

The elasticity moduli and the like of the cores 2, the under cladding layer 1 and the over cladding layer 3 will be described in further detail.

The elasticity modulus of the cores 2 is preferably in the range of 1 to 10 GPa, and more preferably in the range of 2 to 5 GPa. When the elasticity modulus of the cores 2 is less than 1 GPa, there are cases in which the cross-sectional area of the cores 2 cannot be held (the cores 2 are crushed) because of the pressure of the tip input part 10a, depending on the shape of the tip input part 10a such as a pen tip. In such cases, there is a danger that the position of the tip input part 10a is not properly sensed. Whereas, when the elasticity modulus of the cores 2 is greater than 10 GPa, there are cases in which the bend in the cores 2 because of the pressure of the tip input part 10a becomes a gentle bend, rather than a sharp bend along the tip input part 10a. This causes no light leakage (scattering) from the cores 2, so that the level of light received by the light-receiving element 5 is not decreased. In such cases, there is a danger that the position of the tip input part 10a is not properly sensed. The cores 2 have the following dimensions: a thickness in the range of 5 to 100 µm, and a width in the range of 5 to 500 µm, for example.

The elasticity modulus of the over cladding layer 3 is preferably in the range of 0.1 MPa to less than 10 GPa, and more preferably in the range of 1 MPa to less than 5 GPa. When the elasticity modulus of the over cladding layer 3 is less than 0.1 MPa, there are cases in which the over cladding layer 3 is so soft as to be damaged by the pressure of the tip input part 10a, depending on the shape of the tip input part 10a such as a pen tip. In such cases, it is impossible for the over cladding layer 3 to protect the cores 2. Whereas, when the elasticity modulus of the over cladding layer 3 is not less than 10 GPa, the over cladding layer 3 is not deformed by the pressures of the tip input part 10a and the hand 20 in such a manner as to be crushed but the cores 2 are crushed, resulting in a danger that the position of the tip input part 10a is not properly sensed. The over cladding layer 3 has a thickness in the range of 1 to 200 µm, for example.

The elasticity modulus of the under cladding layer 1 is preferably in the range of 0.1 MPa to 1 GPa, and more preferably in the range of 1 to 100 MPa. When the elasticity modulus of the under cladding layer 1 is less than 0.1 MPa, there are cases in which the under cladding layer 1 is too soft to return to its original state after being pressed with the tip input part 10a such as a pen tip, so that the pressing cannot be continuously performed. Whereas, when the elasticity modulus of the under cladding layer 1 is greater than 1 GPa, the under cladding layer 1 is not deformed by the pressures of the tip input part 10a and the hand 20 in such a manner as to be crushed but the cores 2 are crushed, resulting in a danger that the position of the tip input part 10a is not properly sensed. The under cladding layer 1 has a thickness in the range of 20 to 2000 µm, for example.

Examples of the materials for the formation of the cores 2, the under cladding layer 1 and the over cladding layer 3 include photosensitive resins and thermosetting resins. The optical waveguide W may be produced by a manufacturing method depending on the materials. The cores 2 have a refractive index higher than the refractive indices of the under cladding layer 1 and the over cladding layer 3. The adjustment of the elasticity moduli and the refractive indices may be made, for example, by adjusting the selection of the types of the materials for the formation of the cores 2, the under cladding layer 1 and the over cladding layer 3, and the composition ratio thereof. A rubber sheet may be used as the under cladding layer 1, and the cores 2 may be formed in a lattice form on the rubber sheet.

Also, an elastic layer such as a rubber layer may be provided on the back surface of the under cladding layer 1. In this case, when the resilience of the under cladding layer 1, the cores 2 and the over cladding layer 3 is weakened or when the under cladding layer 1, the cores 2 and the over cladding layer 3 are originally made of materials having weak resilience, the elastic force of the elastic layer may be used to assist the weak resilience, thereby allowing the under cladding layer 1, the cores 2 and the over cladding layer 3 to return to their original states after the pressing with the tip input part 10a of the input element 10 is released.

The amount of light leakage (scattering) due to the sharp bend of the cores 2 in the part pressed with the tip input part 10a is important for the purposes of sensing only the position of the tip input part 10a such as a pen tip and not sensing the hand 20 holding the input element 10 such as a pen as mentioned above. A refractive index difference between the cores 2 and the under cladding layer 1 and a refractive index difference between the cores 2 and the over cladding layer 3 are defined, for example, using the ratio A (=R/T) between the radius of curvature R (in µm) of the tip input part 10a such as a pen tip and the thickness T (in µm) of the cores 2. Then, the maximum value $\Delta max$ of the refractive index differences is expressed as in Equation (1) below. When the refractive index difference is greater than the maximum value $\Delta max$, the amount of light leakage (scattering) is small even if the surface of the position sensor A is pressed with the tip input part 10a, so that the level of light received by the light-receiving element 5 is not sufficiently decreased. This makes it difficult to distinguish between the position of the tip input part 10a and the position of the hand 20.

[MATH. 1]
$$\Delta max = 8.0 \times 10^{-2} - A \times (5.0 \times 10^{-4}) \qquad (1)$$

Whereas, the minimum value $\Delta min$ of the refractive index difference is expressed as in Equation (2) below. When the refractive index difference is less than the minimum value $\Delta min$, the light leakage (scattering) occurs also in the part pressed with the hand 20. This makes it difficult to distinguish between the position of the tip input part 10a and the position of the hand 20.

[MATH. 2]
$$\Delta min = 1.1 \times 10^{-2} - A \times (1.0 \times 10^{-4}) \qquad (2)$$

It is therefore preferable that the refractive index difference ranges between the maximum value $\Delta max$ and the minimum value $\Delta min$. For example, the refractive index difference is in the range of $1.0 \times 10^{-3}$ to $7.95 \times 10^{-2}$, when the radius of curvature R (in µm) of the tip input part 10a is in the range of 100 to 1000, the thickness T (in µm) of the cores 2 is in the range of 10 to 100, and the ratio A is in the range of 1 to 100. When the ratio A is greater than 100, the minimum value $\Delta min$ shall be $1.0 \times 10^{-3}$ (constant).

The position of the tip input part 10a sensed by the position sensor A and the movement locus (a character, a figure and the like) of the tip input part 10a which is produced by the successive positions thereof are stored as electronic data in a storage means such as a memory or sent to a display to appear on the display.

Next, an inventive example of the present invention will be described in conjunction with a comparative example. It should be noted that the present invention is not limited to the inventive example.

EXAMPLES

[Material for Formation of Over Cladding Layer]
Component A: 30 parts by weight of an epoxy resin (EPOGOSEY PT available from Yokkaichi Chemical Company Limited).
Component B: 70 parts by weight of an epoxy resin (EHPE3150 available from Daicel Corporation).
Component C: 4 parts by weight of a photo-acid generator (CPI-200K available from San-Apro Ltd.).
Component D: 100 parts by weight of ethyl lactate (available from Wako Pure Chemical Industries, Ltd.).

A material for the formation of an over cladding layer was prepared by mixing these components A to D together.

[Material for Formation of Cores]

Component E: 80 parts by weight of an epoxy resin (EHPE3150 available from Daicel Corporation).

Component F: 20 parts by weight of an epoxy resin (YDCN-700-10 available from Nippon Steel & Sumikin Chemical Co., Ltd.).

Component G: 1 part by weight of a photo-acid generator (SP170 available from ADEKA Corporation).

Component H: 50 parts by weight of ethyl lactate (available from Wako Pure Chemical Industries, Ltd.).

A material for the formation of cores was prepared by mixing these components E to H together.

[Material for Formation of Under Cladding Layer]

Component I: 75 parts by weight of an epoxy resin (EPOGOSEY PT available from Yokkaichi Chemical Company Limited).

Component J: 25 parts by weight of an epoxy resin (JER1007 available from Mitsubishi Chemical Corporation).

Component K: 4 parts by weight of a photo-acid generator (CPI-200K available from San-Apro Ltd.).

Component L: 50 parts by weight of ethyl lactate (available from Wako Pure Chemical Industries, Ltd.).

A material for the formation of an under cladding layer was prepared by mixing these components I to L together.

[Production of Optical Waveguide]

The over cladding layer was formed on a surface of a base material made of glass by a spin coating method with the use of the aforementioned material for the formation of the over cladding layer. The over cladding layer had a thickness of 5 µm, an elasticity modulus of 1.2 GPa, and a refractive index of 1.503.

Next, the cores were formed on a surface of the over cladding layer by a photolithographic method with the use of the aforementioned material for the formation of the cores. The cores had a thickness of 30 µm, a width of 100 µm in a portion of a lattice form, a pitch of 600 µm, an elasticity modulus of 3 GPa, and a refractive index of 1.523.

Next, the under cladding layer was formed on the surface of the over cladding layer by a spin coating method with the use of the aforementioned material for the formation of the under cladding layer so as to cover the cores. The under cladding layer had a thickness of 200 µm (as measured from the surface of the over cladding layer), an elasticity modulus of 3 MPa, and a refractive index of 1.503.

Then, a substrate made of PET (having a thickness of 1 mm) with a double-sided adhesive tape (having a thickness of 25 µm) affixed to one surface thereof was prepared. Next, the other adhesive surface of the double-sided adhesive tape was affixed to a surface of the under cladding layer. In that state, the over cladding layer was stripped from the base material made of glass.

Comparative Example

[Material for Formation of Over Cladding Layer]

Component M: 40 parts by weight of an epoxy resin (EPOGOSEY PT available from Yokkaichi Chemical Company Limited).

Component N: 60 parts by weight of an epoxy resin (2021P available from Daicel Corporation).

Component O: 4 parts by weight of a photo-acid generator (SP170 available from ADEKA Corporation).

A material for the formation of an over cladding layer was prepared by mixing these components M to O together.

[Material for Formation of Cores]

Component P: 30 parts by weight of an epoxy resin (EPOGOSEY PT available from Yokkaichi Chemical Company Limited).

Component Q: 70 parts by weight of an epoxy resin (EXA-4816 available from DIC Corporation).

Component R: 4 parts by weight of a photo-acid generator (SP170 available from ADEKA Corporation).

A material for the formation of cores was prepared by mixing these components P to R together.

[Material for Formation of Under Cladding Layer]

Component S: 40 parts by weight of an epoxy resin (EPOGOSEY PT available from Yokkaichi Chemical Company Limited).

Component T: 60 parts by weight of an epoxy resin (2021P available from Daicel Corporation).

Component U: 4 parts by weight of a photo-acid generator (SP170 available from ADEKA Corporation).

A material for the formation of an under cladding layer was prepared by mixing these components S to U together.

[Production of Optical Waveguide]

An optical waveguide having the same dimensions was produced in the same manner as in Inventive Example. However, the over cladding layer had an elasticity modulus of 1 GPa, the cores had an elasticity modulus of 25 MPa, and the under cladding layer had an elasticity modulus of 1 GPa. Also, the over cladding layer had a refractive index of 1.504, the cores had a refractive index of 1.532, and the under cladding layer had a refractive index of 1.504.

[Production of Position Sensor]

A light-emitting element (XH85-S0603-2s available from Optowell Co., Ltd.) was connected to one end surface of the cores of each of the optical waveguides in Inventive and Comparative Examples, and a light-receiving element (s10226 available from Hamamatsu Photonics K.K.) was connected to the other end surface of the cores thereof. Thus, a position sensor in each of Inventive and Comparative Examples was produced.

[Evaluation of Position Sensor]

A surface of each position sensor was pressed with a pen tip (having a radius of curvature of 350 µm) of a ballpoint pen with a load of 1.47 N, and pressed with a forefinger (having a radius of curvature of 1 cm) of a person with a load of 19.6 N. Then, the levels of light received (the amounts of light received) by the light-receiving element were measured with and without the application of the aforementioned loads. The attenuation rates of the levels of received light were calculated in accordance with Equation (3) below.

[MATH. 3]

$$\text{attenuation rate } (\%) = \frac{\text{amount of light with application of load (mA)}}{\text{amount of light without application of load (mA)}} \times 100 \qquad (3)$$

As a result, the attenuation rate was 80% when the surface of the position sensor in Inventive Example was pressed with the pen tip, and the attenuation rate was 0% when the surface of the position sensor in Inventive Example was pressed with the forefinger. Whereas, the attenuation rate was 60% when the surface of the position sensor in Comparative Example was pressed with the pen tip, and the attenuation rate was 50% when the surface of the position sensor in Comparative Example was pressed with the forefinger.

In the position sensor in Inventive Example, the level of light received by the light-receiving element is decreased when the surface of the position sensor is pressed with the pen tip but is not decreased when the surface of the position sensor is pressed with the forefinger. For this reason, it is found that, in the position sensor in Inventive Example, only the position of the pen tip is sensed but the position of the forefinger is not sensed as in an unpressed state. In the position sensor in Comparative Example, whereas, the levels of light received by the light-receiving element are decreased to the same extent when the surface of the position sensor is pressed with the pen tip and when the surface of the position sensor is pressed with the forefinger. Thus, it is found that, in the position sensor in Comparative Example, not only the position of the pen tip but also the unwanted position of the forefinger are sensed.

Although specific forms in the present invention have been described in the aforementioned example, the aforementioned example should be considered as merely illustrative and not restrictive. It is contemplated that various modifications evident to those skilled in the art could be made without departing from the scope of the present invention.

The position sensor according to the present invention may be used such that only the position or movement locus of a tip input part such as a pen tip, which is necessary, is sensed but the position or the like of a hand, which is unwanted, is not sensed when a person inputs a character and the like while holding an input element such as a pen in his/her hand.

REFERENCE SIGNS LIST

A Position sensor
W Optical waveguide
1 Under cladding layer
2 Cores
3 Over cladding layer
4 Light-emitting element
5 Light-receiving element

What is claimed is:

1. A position sensor in a sheet form comprising:
an optical waveguide in a sheet form including an under cladding layer in a sheet form, a plurality of linear cores arranged in a lattice form and formed on a surface of the under cladding layer, and an over cladding layer in a sheet form formed to cover the cores;
a light-emitting element connected to one end surface of the cores; and
a light-receiving element connected to the other end surface of the cores,
wherein a pressed position is specified, based on a change in the amount of light propagating in the cores, when a surface of the position sensor is pressed at any position,
wherein the cores have an elasticity modulus of 2 GPa to 5 GPa,
wherein the under cladding layer has an elasticity modulus of 1 MPa to 100 MPa,
wherein the over cladding layer has an elasticity modulus of 1 MPa to less than 5 GPa, and
wherein the deformation rate of a cross section of the cores as seen in a pressed direction is lower than the deformation rates of cross sections of the over cladding layer and the under cladding layer when a surface of the optical waveguide in the sheet form is pressed.

2. The position sensor according to claim 1, wherein the elasticity modulus of the under cladding layer and the elasticity modulus of the over cladding layer are different.

3. The position sensor according to claim 1, wherein the elasticity modulus of the over cladding layer is greater than the elasticity modulus of the under cladding layer.

* * * * *